2 Sheets--Sheet 1.

T. R. SCOWDEN.

Apparatus for Converting Iron into Steel by Means of Hydrocarbon Vapors.

No. 5,165. Reissued Nov. 26, 1872.

Attest.
Jas. H. Layman.
Wm. M. Davis.

T. R. Scowden
By Knight Bros.
Attys.

T. R. SCOWDEN.

Apparatus for Converting Iron into Steel by Means of Hydrocarbon Vapors.

No. 5,165. Reissued Nov. 26, 1872.

Attest.
Jas. H. Layman
Wm. M. Davis.

T. R. Scowden
By Knight Bros
Att'ys.

UNITED STATES PATENT OFFICE.

THEODORE R. SCOWDEN, OF CINCINNATI, OHIO.

IMPROVEMENT IN APPARATUS FOR CONVERTING IRON INTO STEEL BY MEANS OF HYDROCARBON VAPORS.

Specification forming part of Letters Patent No. 130,540, dated August 13, 1872; reissue No. 5,165, dated November 26, 1872.

*To all whom it may concern:*

Be it known that I, THEODORE R. SCOWDEN, of Cincinnati, Hamilton county, Ohio, have invented an Apparatus for the Conversion of Iron into Steel, of which the following is a specification:

*Nature and Objects of the Invention.*

My invention relates to a new and useful construction of those apparatus in which articles of iron have their exterior portions or entire substance converted into steel by treatment with hydrocarbon vapor in a close and highly-heated retort; and my invention consists, in its first part, in the provision of an opening at each end of the retort, through which access can be had to the retort at either end without disturbing or materially cooling the contents of the other end of the retort. My invention consists, as to its second part, in the provision of a furnace under each end of the retort, so as to make it possible to heat all parts alike, or either end more or less than the other, as may be found desirable. My invention consists, as to the third part, in a certain arrangement of pipes for forcing a jet of hydrocarbon at each end and on opposite sides of the retort in connection with a current, to be reversed at pleasure, of deoxygenated air for producing uniform carbonization of the metal in the retort by the effective circulation of these gases.

*Description of the Accompanying Drawing.*

Figure 1:
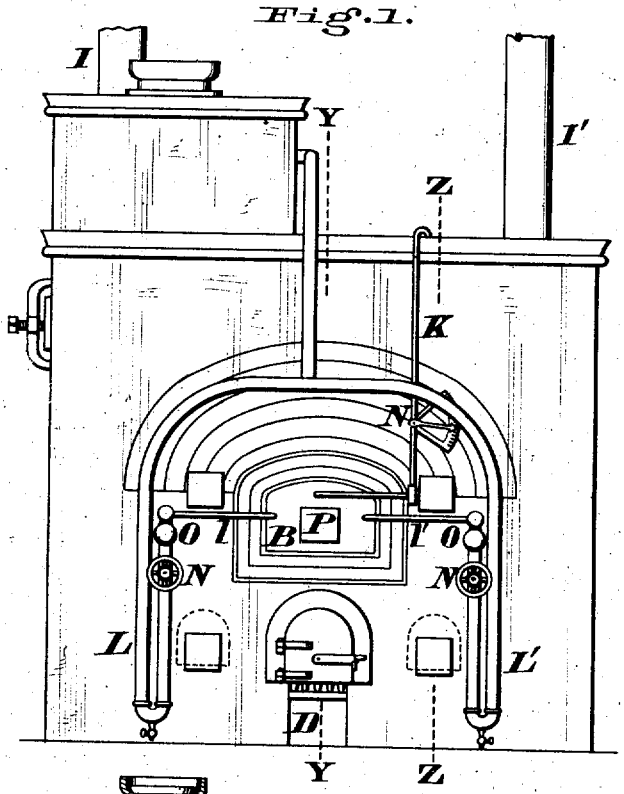
Figure 2:
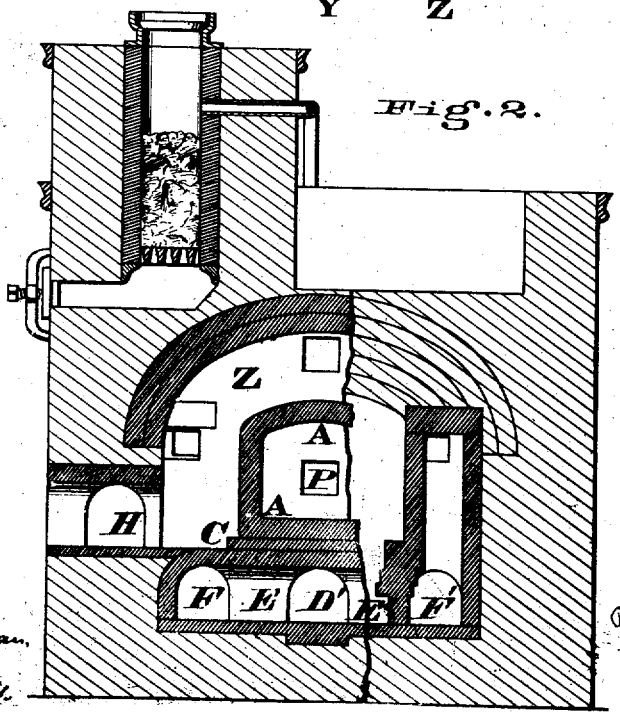
Figure 3:
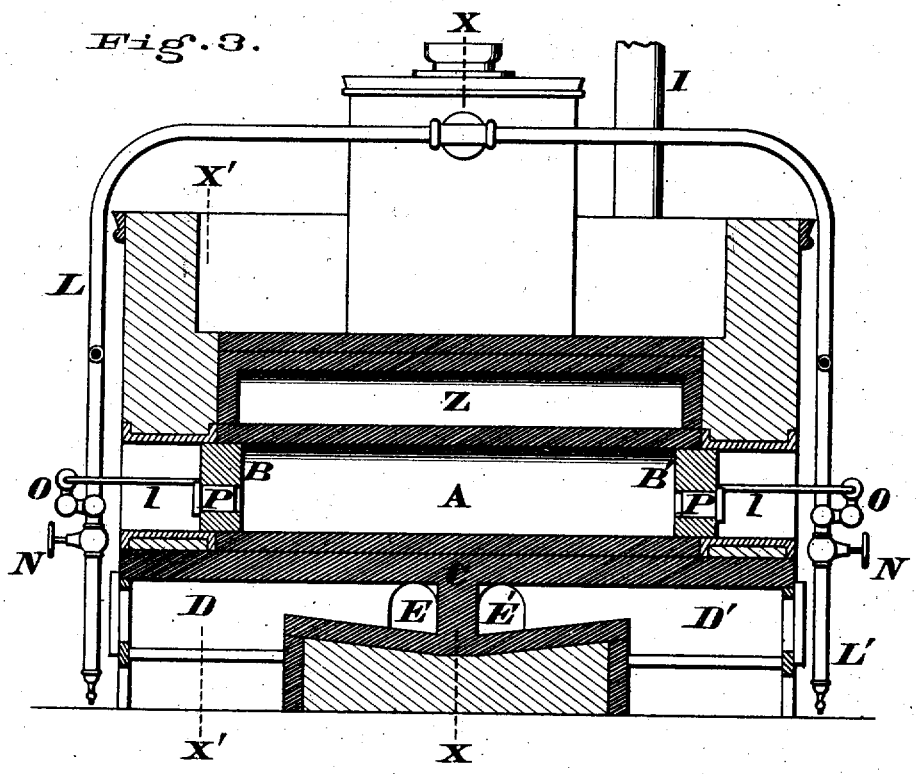
Figure 4:
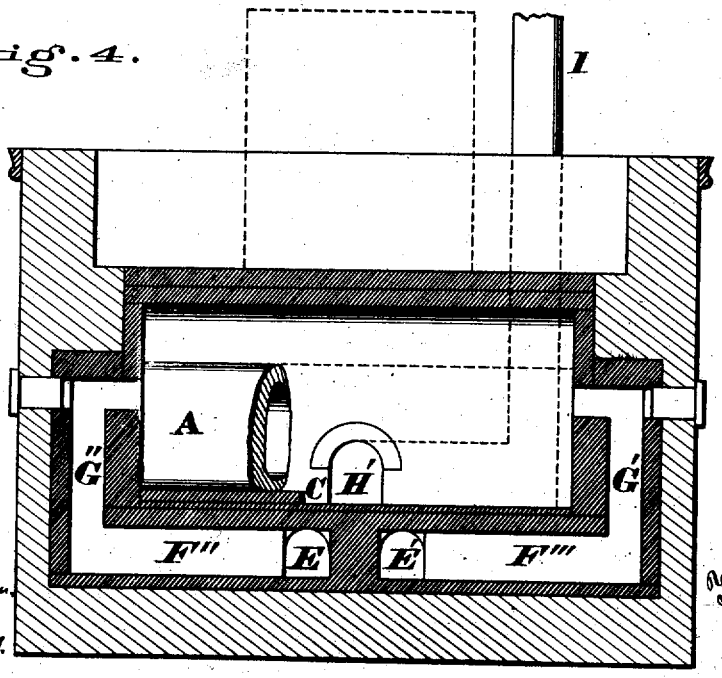

Figure 1 is a front elevation of an apparatus embodying my invention. Fig. 2 is a transverse section at the lines *x x* and *y′ y′*. Figs. 3 and 4 are longitudinal sections at the lines *y y* and *x x*, respectively.

The retort A may be of the represented cylindroidal form, having the arched transverse section here shown. It must, in my apparatus, be arranged to open at both ends, and have its ends capable of being closed by means of doors or stoppers B B′, which are luted and fastened in any customary way of closing the mouths of retorts. The material of the retort is of fire-tile or any highly-refractory material. The retort rests upon a floor of the heated chamber C, which floor constitutes the roof of two precisely similar fire-chambers or furnaces, D D′, located under the opposite ends of the retort and fed and operated from opposite ends of the furnace. Flues E E′, starting at the fire-chambers, pass at first laterally right and left, thence through four separate return-chambers, F F′ F″ F‴, which, rising at G G′ G″ G‴, coalesce and form the heating-chamber Z, around the sides and over the top of the retort, whence the smoke is conducted by two equal channels, H H′, to chimneys I I′, having customary dampers. K K′ are pipes which conduct the petroleum or any other hydrocarbons into one or both ends of the retort, and whose force may be due to an elevated reservoir, (not shown,) or be controlled by a pump either acting directly upon the liquid or on a body of air above it. L L′ *l l′* are pipes, one or more of which are used at a time, which conduct deoxygenated air from a furnace, filled with incandescent charcoal, into one or both ends of the retort. All of these pipes are provided with suitable cocks N to regulate a needful supply of their contents into the retort, and with joints O or other means of readily connecting or disconnecting them from the retort. Orifices or ports P in the doors B B′, closable by stoppers, enable inspection or manipulation of the contents without opening the doors of the retort.

The carbonization or steelifying of iron in retorts supplied by hydrocarbon vapor has heretofore, theoretically and, to a limited extent, successfully been done before my said invention, but has failed of practical and commercial success because of the expensive, unmanageable, and unequal carbonization of the iron submitted to that treatment. The retort being open at one end only, that end was liable to become cooled to a point below the necessary carbonizing temperature of the metal contained, while the closed remote end would be too highly heated, and, being at the same time the least accessible, excessive carbonization would result, and even fusion of the metal often took place at this end. This difficulty was aggravated by the fact that in order to remove the contents of the retort from the remote end the articles nearer the mouth, imperfectly if at all carbonized, would have to be taken out and again subjected to the process or become useless. The single furnace, fixed at one end as heretofore, used for carbonizing iron, was not sufficiently uniform in its action throughout the retort, nor did it afford means, as does my double furnace, of exactly tempering and modulating the heat at either end of the furnace, as circumstances and the nature and condition of the work may require or make desirable.

I have selected, to illustrate my invention, the form preferred by me, but reserve the right to vary the same in non-essential particulars. For example: In my improvement the two pipes conveying hydrocarbon may be employed alternately or simultaneously, and with them one or more pipes carrying deoxygenated air, and these pipes may be so employed as to produce an active circulation and equal diffusion of the gases throughout the retort, and consequently uniform action upon its contents. I have described my improvements in their application to one retort, but it is obvious that two or more retorts may be employed if desired; and, although describing and preferring oppositely-placed fire-chambers, two in number, it is obvious that a greater number and differently-placed fire-chambers might be made to effect the explained purposes of equal or optional firing and heating of the several parts of the retort, and for this purpose the entire furnace might have the represented oblong or a circular or polygonal exterior. When a circular retort is employed the fire-chambers should be arranged in a radial manner; or the chambers may be located on the sides or at any other suitable part of the apparatus, no matter what the shape of the furnace, whether round, oblong, or polygonal.

I do not claim as new the use of hydrocarbon or other jets in a steelifying retort; nor do I claim broadly, or for other use than such a retort as here adapted, the employment of a stopper at each end thereof and fires at each end of the furnace beneath the same, all of these features and the hydrocarbon process of making steel having been separately known; but by combining and adapting these devices in the manner above set forth I claim to have invented a new and useful furnace, in which the hydrocarbon process of manufacturing steel has been performed and illustrated as a practical and commercial success—a success accomplished simply and solely by an improvement which has given utility and extensive application to what was before practically valueless. This apparatus, although designed and chiefly intended for recarbonization, as set forth, may obviously be employed for decarbonization, if desired. It is believed that a retort constructed as above can be employed for decarbonization, without the necessity of the customary annealing-cans, by means of any oxygenizing agent.

*Claims.*

I claim herein as new and of my invention—

1. The described arrangement of double-ended retorts and furnace-fire at each end, in combination with apparatus for double and alternating supply of hydrocarbon, as and for the purpose explained.

2. The described arrangement in such retort of the duplicated apparatus L L′ *l l′* for supplying deoxygenated air and of the hydrocarbon-pipes K K′.

3. The apparatus in a steelifying retort for supplying hydrocarbon and deoxygenated air at each end of the retort, adapted and arranged as set forth.

4. The decarbonization of cast or other supercarbonized iron or steel in a retort, as above described.

In testimony of which invention I hereunto set my hand.

THEODORE R. SCOWDEN.

Attest:

GEO. H. KNIGHT,
JAMES H. LAYMAN.